(12) United States Patent
Doms

(10) Patent No.: US 9,870,569 B2
(45) Date of Patent: Jan. 16, 2018

(54) FLEXIBLE ENERGY USE OFFERS

(71) Applicant: Andreas Doms, Dresden (DE)

(72) Inventor: Andreas Doms, Dresden (DE)

(73) Assignee: SAP SE, Walldorf (DE)

( * ) Notice: Subject to any disclaimer, the term of this patent is extended or adjusted under 35 U.S.C. 154(b) by 432 days.

(21) Appl. No.: 14/106,014

(22) Filed: Dec. 13, 2013

(65) Prior Publication Data

US 2015/0170176 A1   Jun. 18, 2015

(51) Int. Cl.
| | |
|---|---|
| G06Q 10/00 | (2012.01) |
| G06Q 20/00 | (2012.01) |
| G06Q 30/02 | (2012.01) |
| G06Q 50/06 | (2012.01) |

(52) U.S. Cl.
CPC ......... *G06Q 30/0206* (2013.01); *G06Q 50/06* (2013.01)

(58) Field of Classification Search
USPC ............................................. 705/7.11–7.42
See application file for complete search history.

(56) References Cited

U.S. PATENT DOCUMENTS

| | | | |
|---|---|---|---|
| 5,927,598 A | 7/1999 | Broe | |
| 6,681,155 B1 | 1/2004 | Fujita et al. | |
| 6,925,362 B2 | 8/2005 | Machitani et al. | |
| 7,698,189 B2 | 4/2010 | Mathews et al. | |
| 7,813,814 B2 | 10/2010 | Dittes | |
| 8,156,355 B2 | 4/2012 | Mendel et al. | |
| 8,249,942 B2 | 8/2012 | Mesaros | |
| 8,311,896 B2 | 11/2012 | Mesaros | |
| 8,417,391 B1* | 4/2013 | Rombouts | G05B 13/02 700/286 |
| 2007/0185729 A1* | 8/2007 | Segerman | G06Q 50/06 705/412 |
| 2008/0229226 A1* | 9/2008 | Rowbottom | H05B 37/0245 715/771 |
| 2008/0306985 A1* | 12/2008 | Murray | G06Q 10/10 |
| 2009/0150273 A1 | 6/2009 | Lehman et al. | |
| 2011/0246259 A1 | 10/2011 | Hostyn et al. | |
| 2012/0259760 A1 | 10/2012 | Sgouridis et al. | |
| 2013/0054036 A1* | 2/2013 | Cherian | G06Q 10/06 700/286 |
| 2013/0144451 A1 | 6/2013 | Kumar et al. | |

(Continued)

FOREIGN PATENT DOCUMENTS

| | | |
|---|---|---|
| EP | 2456076 A1 | 5/2012 |
| EP | 2579415 A1 | 4/2013 |

OTHER PUBLICATIONS

Garud, et al., "Using the Brain as a Metaphoe to Model Flexible Production Systems", Center for Digital Economy Research, Stern School of Business, NYU, Academy of Management Review, 1994, vol. 19, No. 4, pp. 671-697; Dec. 1997.*

(Continued)

*Primary Examiner* — Amber A Misiaszek
(74) *Attorney, Agent, or Firm* — Brake Hughes Bellermann LLP

(57) ABSTRACT

A computer-implemented method includes receiving an offer of a flexible demand response event from a customer of a utility company, and determining a price of the offer in context of a load-supply balancing operation of the utility company.

20 Claims, 6 Drawing Sheets

(56) References Cited

U.S. PATENT DOCUMENTS

2013/0178991 A1* 7/2013 Gheerardyn .......... G05B 13/02
700/286

OTHER PUBLICATIONS

"Demand Response", retrieved from: http://en.wikipedia.org/wikilDemand_response, May 7, 2014, 11 pages.
"Energy Storage Keeping smart grids in balance", retrieved from http://www05.abb.com/global/scot/scot221.nsf/veritydisplay/59a2be960fdb777a48257a680045c04a/$file/ABB%20Energy%20Storage_Nov2012.pdf, Nov. 2012, 12 pages.

* cited by examiner

FLEXIBLE ENERGY USE OFFERS

BACKGROUND

Energy markets are commodity markets that deal specifically with the trade and supply of energy. An energy market may be an electricity market, but can also refer to other sources of energy.

Dynamic electricity pricing, with prices changing at time intervals (e.g., hourly) based on supply and demand, provides a powerful incentive for electricity consumers to draw electricity or run loads when prices are low. In a traditional dynamic pricing scheme, a utility company may set forth a time schedule of price incentives to modify electricity consumption. Consumers may schedule deferrable loads (e.g., air conditioning, heating, charging electric vehicles, industrial processes, etc.) according to the time schedule of price incentives set forth by the utility company to reduce or minimize their (the consumer's) electricity bills.

In an energy market, electricity may be distributed to consumers, for example, by a utility company over an electrical grid. The utility company may source a supply of electricity for the grid from various power plants or generators, which may be based on non-renewable energy sources (e.g., nuclear, fossil, etc.) and/or renewable energy sources (e.g., wind, solar, tidal, etc.). The supply of electricity may not be assured at all times as the amount of electricity generated by the various power plants or generators may be subject to time-varying local conditions. For example, the amount of electricity generated by wind or solar power generators may be subject to local weather conditions (e.g., low wind or cloud cover, etc.), which can change with time in a day. To effectively utilize or add electricity generated by renewable energy sources to the supply of electricity for the electrical grid, the utility company may seek short term balancing of load and supply on the electrical grid. The utility company may, for example, set different electricity prices for different time intervals (e.g., during a 24 hour time period) to encourage increased consumption or demand during periods of abundant or assured supply and to encourage decreased consumption or demand during periods of tight or scarce supply. Consumers may also actively participate in the setting of prices in the energy market by trading or negotiating time flexibility in their electricity demand or draw for better prices. Consumer offers of flexibility in their electricity demand or draw from an electrical grid may include amount, price and time constraints. For example, an industrial consumer may offer to run an electricity-consuming industrial process (e.g., an electric oven) at a time of the utility company's choice within a time window (e.g., between 11 p.m. and 3 am). A residential customer may offer to modify or adjust room temperature control settings in his or her residence so that an electricity-consuming air-conditioning system loads or draws electricity from the electrical grid in an amount and at a time of the utility company's choice. A consumer may offer to recharge his or her electric vehicle on a time schedule of the utility company's choice as long as the vehicle battery is first at least half-charged and the price is 50% less than a regular price.

Like the consumers' offers of flexibility in electricity demand or draw, suppliers or producers of electricity may also make offers of flexibility in electricity supply to the electrical grid subject to amount, time and/or price constraints.

There is need for systems and methods for evaluating and integrating offers of flexible demand or supply in energy market pricing schemes for electricity delivered over an electrical grid.

SUMMARY

The term "demand response" may be understood to refer to changes in electricity usage by customers from their normal consumption patterns. The changes in electricity usage may include a change in an amount of electricity consumed and/or a shift in usage time. A proposed or actual occurrence of a demand response may be referred to herein as a "demand response event." Additionally, it will be understood that for convenience in description and brevity herein, a consumer (or supplier) offer of flexibility in electricity demand (or supply) response may be referred to simply as an "offer," a "flexible offer," a "flexible demand response offer" or a "flex-offer" in the following description. A proposed or actual occurrence of a demand response within a scope of a flex-offer may be referred to as a "flexible demand response event."

Further, a balance responsible partner (BRP) entity, which may be associated with a utility company, may be the entity responsible for maintaining a balance of demand and supply on an electrical grid. The terms "balance responsible partner (BRP)" and "utility company" may be used interchangeably hereinafter at least in the context of maintaining a balance of demand and supply on the electrical grid.

In a general aspect, a computer system includes a memory and a processor configured to run an evaluator application. The evaluator application is configured to evaluate or determine a price value of an offer of a flexible demand response event in context of a load-supply balancing operation of a utility.

In an aspect, the evaluator application is configured to value individual flexibilities of one or more parameters of the flexible demand response event in context of the load-supply balancing operation of the utility, and aggregate the values of the individual flexibilities as a single price of the offer.

In a further aspect, the evaluator application is configured to individually value one or more of a time-to-assignment flexibility, a start-time-interval flexibility and an energy flexibility of the flexible demand response event in context of the load-supply balancing operation of the utility.

In a yet another aspect, the evaluator application is configured to individually value one or more of a time-to-assignment flexibility, a start-time-interval flexibility and an energy flexibility using a logistics function or an approximation to the logistics function to compute price.

In a general aspect, a computer-implemented method, which can be performed by instructions executed on a processor, includes receiving an offer of a flexible demand response event from a customer of a utility company, and determining a price of the offer in context of a load-supply balancing operation of the utility company.

In an aspect, receiving the offer of a flexible demand response event from a customer of a utility company includes receiving an offer, which states one or more of a time to accept the offer, a time to assign the flexible demand response event in the load-supply balancing operation of the utility company, a start_after_time parameter and a start_before_time parameter for the flexible demand response event, a minimum_energy_required parameter and a maximum_energy_required parameter for a time interval of the flexible demand response event.

In an aspect, determining a price of the offer in context of a load-supply balancing operation of the utility company includes determining individual prices for flexibilities of one or more parameters of the flexible demand response event in the offer and aggregating the individual prices to obtain an aggregate price of the offer in context of the load-supply balancing operation of the utility company.

In another aspect, determining a price of the offer in context of a load-supply balancing operation of the utility company includes using a logistics function or an approximation of the logistics function to compute the price.

In a general aspect, a non-transitory computer readable medium includes instructions capable of being executed on a processor. The instructions when executed allow a computing device to receive an offer of a flexible demand response event from a customer of a utility company, and determine a price of the offer in context of a load-supply balancing operation of the utility company.

The details of one or more implementations are set forth in the accompanying drawings and the description below. Further features of the disclosed subject matter, its nature and various advantages will be more apparent from the accompanying drawings the following detailed description, and the claims.

DETAILED DESCRIPTION

Participants (e.g., consumers, producers, suppliers, etc.) in an energy market (e.g., an electricity market) may have time and capacity flexibility in using or supplying energy. The participants may trade or negotiate their time and capacity flexibility for better prices or other consideration on the energy market. For convenience in description herein, suppliers or producers of energy may also be referred to as "consumers" or "customers" herein, with the understanding that a supply of a positive amount of energy is equivalent to use of a negative amount of energy.

In the case of an electrical grid, a utility company or balance responsible partner ("BRP") may, for example, undertake load balancing (with supply) on the electrical grid by using dynamic pricing as a market incentive to time shift electricity demand by consumers relative to the electricity supply on the electrical grid provided by electricity suppliers or producers. The term "demand response" may used herein to refer to changes in electric usage by customers from their normal consumption patterns in response to changes in the price of electricity over time.

Figure 1:
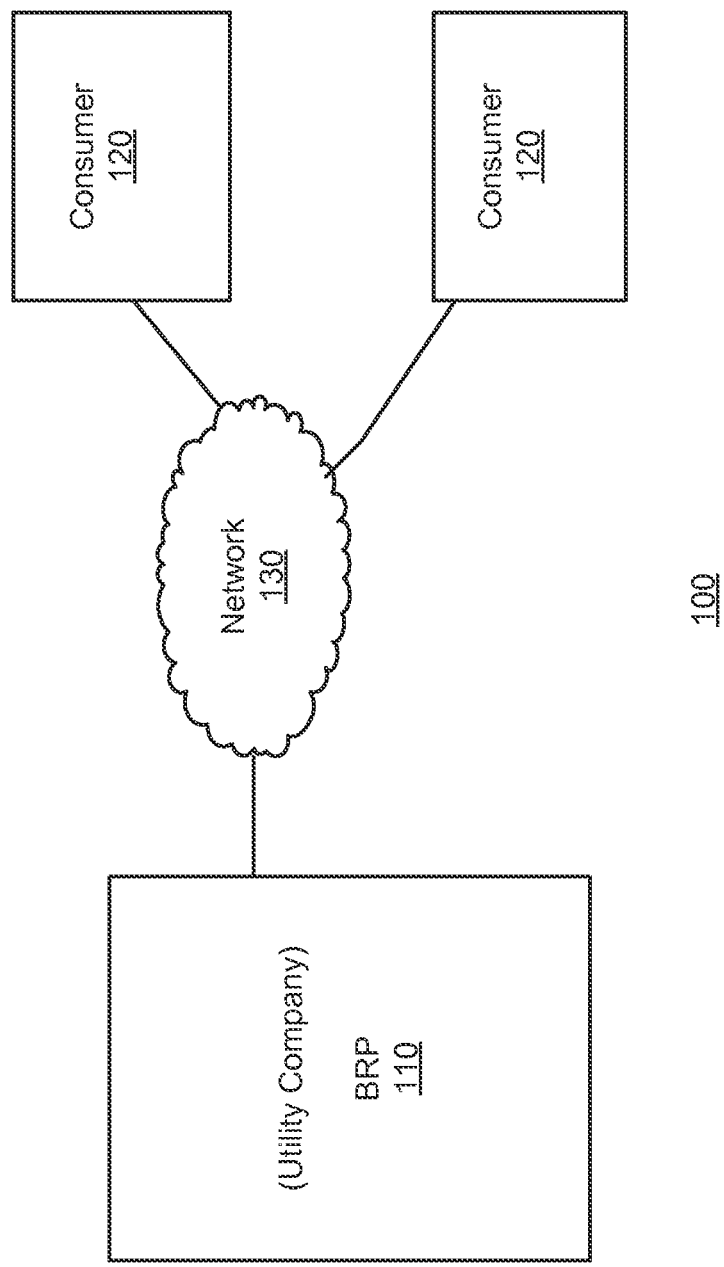
FIG. 1 is a block diagram illustration of a system in which a utility company or an associated balance responsible partner (BRP) and one or more consumers of the utility company are communicatively linked via a communications network, in accordance with principles of the disclosure herein.

FIG. 1 shows schematically a system 100 in which a BRP 110 and one or more consumers 120 of an electrical utility are communicatively linked via a communications network 130. Network 130 may be a wired network or a wireless network.

The BRP may use the communication network to receive offers of flexible demand response ("offers" or "flex-offers") from consumers. The BRP may use the flex-offers to help with short term (e.g., hour-to-hour or minute-to-minute) load balancing and/or reductions in supply costs. The BRP may accumulate a large number of flex-offers received over the communication network, evaluate the flex-offers, and accept one or more of them to enable the utility company/BRP to react to short term demand and supply changes.

A consumer's offer a flexible demand response may not be open ended but may include parameters which, for example, define a suggested price, how much time the BRP has to accept or reject the offer, a range of a minimum energy and a maximum energy required by the consumer, and an amount of time flexibility in starting to execute the consumer's demand response event, etc.

Figure 2:
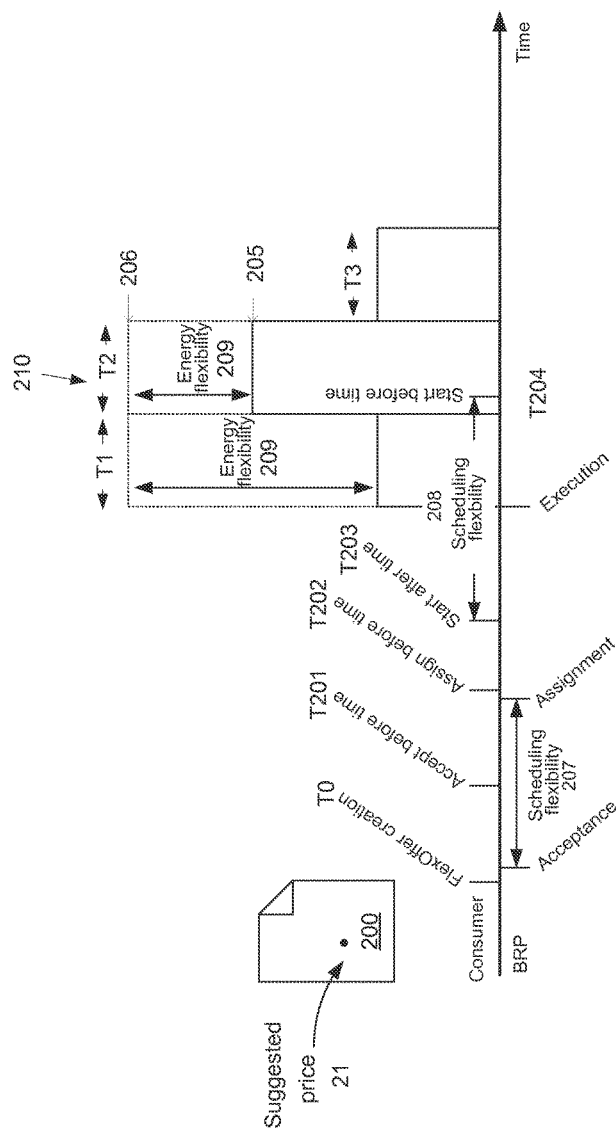
FIG. 2 is a schematic illustration of example parameters of a flexible demand response offer in the context of utility company-consumer interactions, and a corresponding demand response event, along a time line, in accordance with principles of the disclosure herein.

FIG. 2 schematically shows example parameters of a flex-offer 200 in the context of BRP-consumer interactions, and a corresponding demand response event 210 along a time line. As shown in the figure, the consumer may create a flex-offer 200 for a demand response event 210 and send it at time T0 to the BRP or utility company over the communication network.

Flex-offer 200 may include conditions or parameters associated with the offer (e.g., a suggested price 21, accept before time (T201), assign before time (T202), start after time (T203), start before time (T204), a minimum energy required 205, a maximum energy required 206, etc.).

Start after time T203 and start before time T204 may define a time span within which the consumer intends or wants to start executing the demand response event 210. Accept before time T201 may set a deadline for the BRP to accept the offer. Assign before time T202 may set a deadline for the BRP to assign or commit to the timing and amount of electricity supply for execution of the demand response event (which may begin after start after time T203 but before start before time T204 at the BRP's discretion) and communicate to the consumer details of when and how to consume the electricity supply. The difference between acceptance (or accept before time T201) and assign before time T202 may indicate a "time-to-assignment" flexibility 207 that the BRP has under flex-offer 200. The time-to-assignment flexibility may be a measure of how much time is available to the BRP for scheduling energy supply for the demand response event of flex-offer 200. Similarly, the difference between start after time T203 and start before time T204 may indicate a "start-time-interval" flexibility 208 that the BRP has under flex-offer 200. The start-time-interval flexibility 208 may be a measure of a range of time that is acceptable to the customer for starting execution of the demand response event and the range of time in which the BRP can schedule a start of the demand response event of flex-offer 200. Further, the difference between minimum energy required 205 and maximum energy required 206 may indicate an "energy flexibility" 209 that the BRP has under flex-offer 200. Energy flexibility 209 may be a measure of a range of energy that is acceptable to the customer for executing the demand response event and the flexibility in the amount of energy supply that the BRP has to commit to when scheduling execution of the demand response event of flex-offer 200. As shown in the figure, flex-offer 200 may include different energy flexibilities 209 for different time intervals (e.g., T1, T2 and T3) in demand response event 210. The different energy flexibilities 209 may define an energy flexibility profile for demand response event 210.

Figure 3:
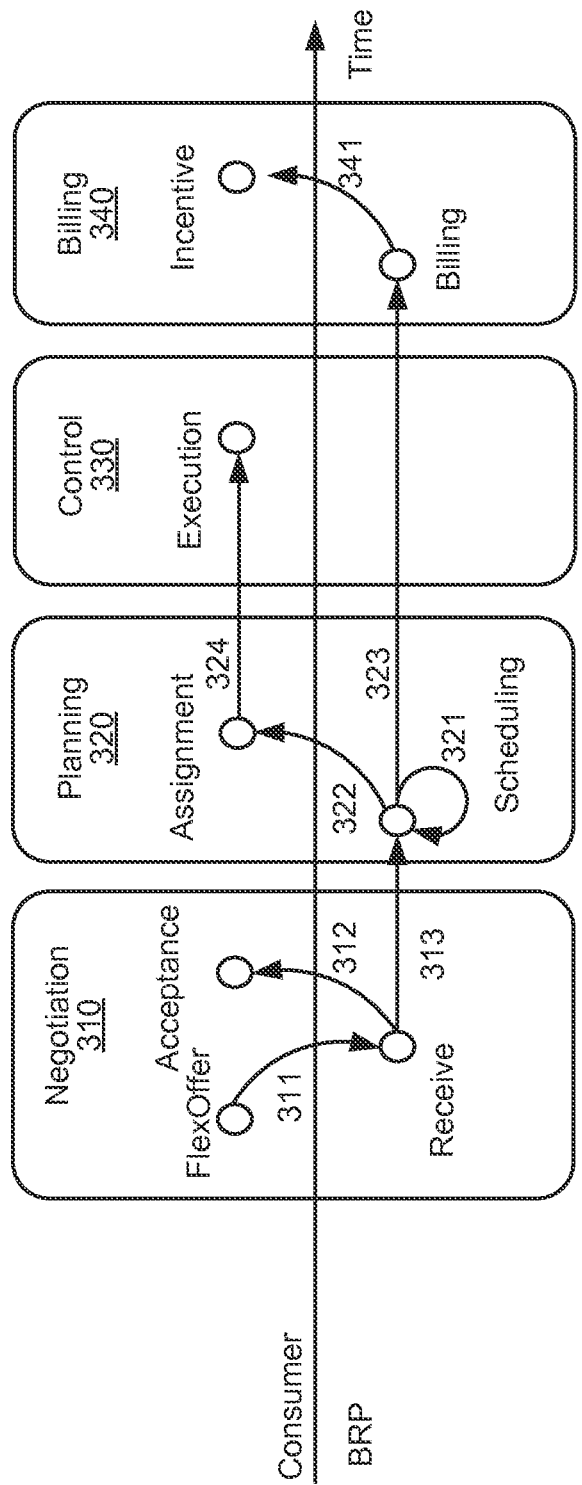
FIG. 3 is a block diagram illustration of an example business process model including example actions that may be carried out by a BRP and a consumer in the course of processing a flexible demand response offer along time line T, in accordance with principles of the disclosure herein.

FIG. 3 shows an example business process model 300, which shows example actions that may be carried out in groups or phases by the BRP and the consumer in the course of processing flex-offers (e.g., flex-offer 200) along a time line. In FIG. 3, business process model 300 is shown, for example, as having four modules (e.g., negotiation 310, planning 320, execution 330 and billing 340) representing different groups or phases of actions in the course of processing flex-offer 200 along the time line.

In negotiation module 300, the BRP may receive a flex-offer (e.g., flex-offer 200) of a flexible dynamic response event from the consumer (311), and after evaluation of the flex-offer, the BRP may send acceptance of the flex-offer to the consumer (312). The BRP may also notify the planning module to prepare for implementation or execution of the demand response event of the flex-offer (313). If the BRP rejects flex-offer 200, the consumer may be free to consume electricity as usual (not shown).

In planning module 320, the BRP may undertake to schedule the demand response event (321) and notify the customer of an assigned time (and other parameters) when the customer may expect to initiate execution of the demand response event (322). The BRP may also inform billing module 340 of the parameters (e.g., time, energy amounts) of the scheduled response event (323). The customer may upon receiving notification of the assigned time prepare to execute the demand response event (324). In business process model 300, the execution of the demand response event is shown as occurring in control module 330. In billing module 340, the BRP may credit the consumer's account with an incentive (e.g., a monetary rebate) for the flexible demand response event offer (e.g. flex-offer 200) (341).

Figure 4:
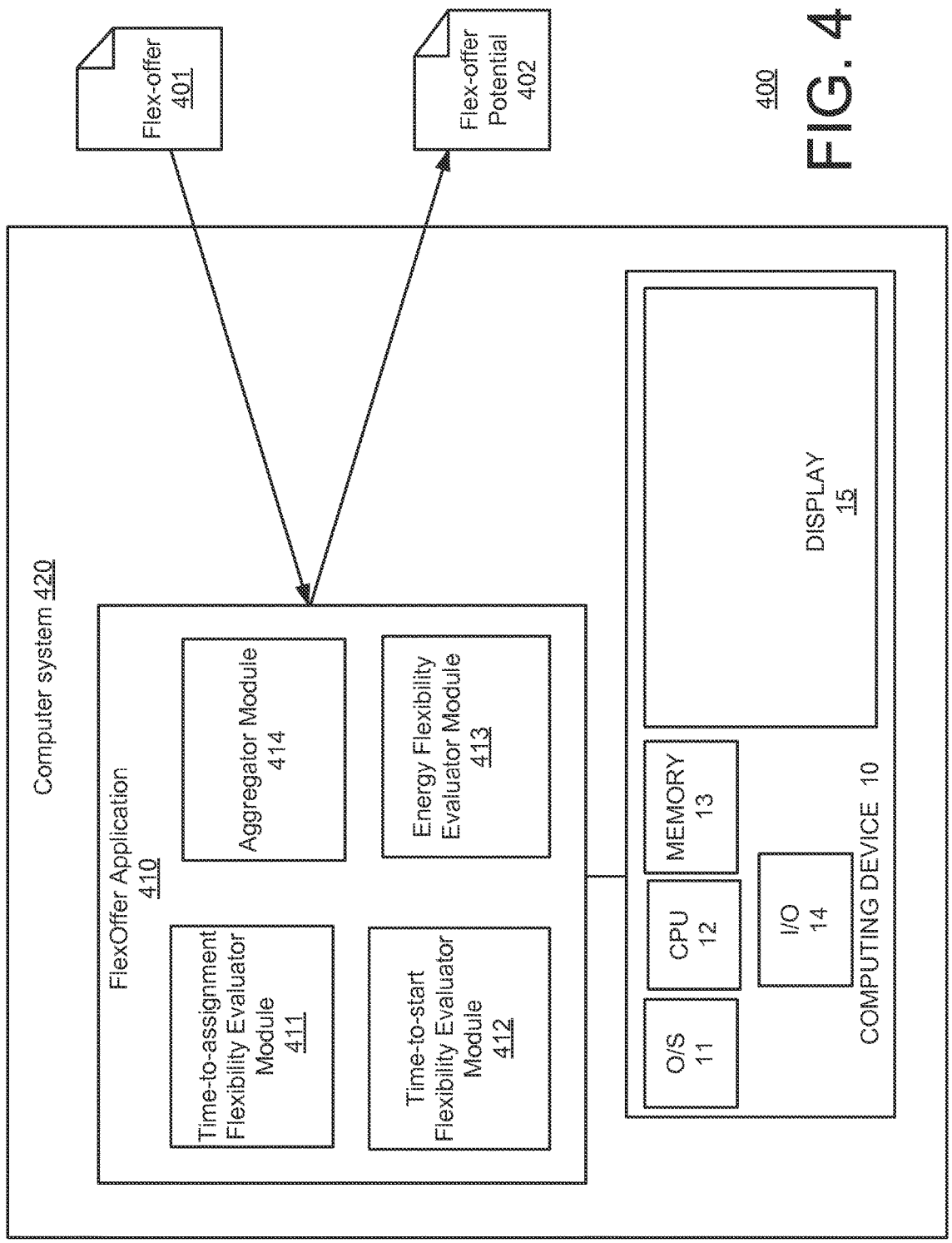
FIG. 4 is a block diagram illustration of an example system, which is configured to evaluate offers of flexible demand response events that a utility company may receive from its customers, in accordance with principles of the disclosure herein.

FIG. 4 shows an example system 400, which is configured to evaluate offers of flexible demand response events that a utility company or BRP may receive from its customers. System 400 may include an evaluator application 410 hosted on a computer system 420. Evaluator application 410 may use one or more algorithms to evaluate a price value of an offer ("flex-offer") of a flexible demand response event based on a potential of the flexible demand response event for integration or use in a load-supply balancing operation of the utility. The price value of the offer may be based on, for example, the amount or degree of flexibility proposed by the customer in one or more parameters of the flexible demand response event. The BRP's acceptance of the flex-offer and also any monetary rebate or incentive credited to the consumer may be based on the computed price value of the offer of a flexible demand response event.

In system 400, computer system 420 may include one or more standalone or networked physical or virtual computing machines. FIG. 4 shows, for example, computer system 420 as including a standalone computing device 10 (e.g., a desktop computer, a mainframe computer, a personal computer, a mobile computing device, a laptop, a tablet, or a smart phone), which may be available to a user. Computing device 10, which includes an O/S 11, a CPU 12, a memory 13, and I/O 14, may further include or be coupled to a display 15. Moreover, although computer 10 is illustrated in the example of FIG. 4 as a single computer, it may be understood that computer 10 may represent two or more computers in communication with one another. Therefore, it will also be appreciated that any two or more components of system 400 may similarly be executed using some or all of the two or more computing devices in communication with one another.

Evaluator application 410, hosted on computer system 420, may be configured to support a business process or workflow (e.g., business process model 300) of the utility company or BRP. Evaluator application 410 may be linked, for example, via Internet or intranet connections, to data sources on the web (e.g., worldwide and/or enterprise webs) and/or other computer systems of the organization (e.g., work flow scheduling systems, financial billing systems, supplier management systems, material systems, customer relations management systems, operations, etc.) (not shown) that may have information relevant to the implementation of business process model 300.

In system 400, evaluator application 410 may be configured to assess or evaluate a price value of a flex-offer (e.g., flex-offer 401) in terms of a single metric i.e. "flex-offer potential." The flex-offer potential metric may individually value flexibilities of one or more parameters (e.g. time-to-assignment flexibility, energy flexibility, start-time-interval flexibility, etc.) of a proposed demand response event in the flex-offer in context of the load-supply balancing operation of the utility, each as a separate time resource, and aggregate the values of the individual flexibilities as a single price value of the flex-offer. A flex-offer which has an aggregate high potential, may correspond to a flex-offer which includes a proposed demand response event that may potentially result in a high profit margin for the BRP. Conversely, a flex-offer which has an aggregate low potential, may correspond to a flex-offer which includes a proposed demand response event that may potentially result in a low profit margin for the BRP.

In example implementations of system 400 and evaluator application 410, the flex-offer metric may be expressed in energy price units ("ct"). For example, a flex-offer may be evaluated as having a potential 5 ct while another flex-offer may be evaluated as having a potential 2 ct.

As noted previously, example evaluator application 410 may value individual flexibilities (e.g., time-to-assignment flexibility, start-time-interval flexibility and energy flexibility) in flex-offer 401 at least initially separately. Evaluator application 410 may, for example, include individual evaluator modules or sub-modules (e.g., time-to-assignment flexibility evaluator module 411, start-time-interval flexibility evaluator module 412, and energy flexibility evaluator module 413) to separately evaluate and return price values for time-to-assignment flexibility, start-time-interval flexibility and energy flexibility. Evaluator application 410 may further include an aggregator module 414, which is configured to aggregate (e.g., as a weighted average) the price values of the individual flexibilities to generate a flex-offer potential value (e.g., flex-offer potential 402) for the entire flex-offer.

As an example, modules 411-413 may return values of 0.5 ct, 1 ct, and 1.5 ct as price values for time-to-assignment flexibility, start-time-interval flexibility and energy flexibility, respectively, of a flex-offer. Further in the foregoing example, using an equally weighted sum, aggregator module 414 may return a price value of 3.0 ct the potential of the flex-offer.

The individual evaluator modules or sub-modules in evaluator module 410 may be configured to evaluate and value the individual flexibilities using algorithms based on empirical price functions of the individual flexibilities, in accordance with the principles of the disclosure herein.

Time-to-Assignment Flexibility Evaluator Module 411

For example, time-to-assignment flexibility evaluator module 411 may include algorithms based on an empirical function (e.g., function 500, FIG. 5), which convert a time-to-assignment parameter in the flex-offer into an energy price. The empirical function used may be based on recognition that only a finite interval of time-to-assignment parameter values (e.g., a min_time_for_assignment parameter to a max_time_for_assignment parameter) may be useful to the BRP for short term balancing of load and supply. Small values of time-to-assignment may afford little flexibility to the BRP and thus may be of little value to the BRP. Conversely, large time-to-assignment values above the finite time interval may not be proportionally more useful to the BRP for short term balancing of load and supply, and thus may be of limited additional value to the BRP.

Figure 5:
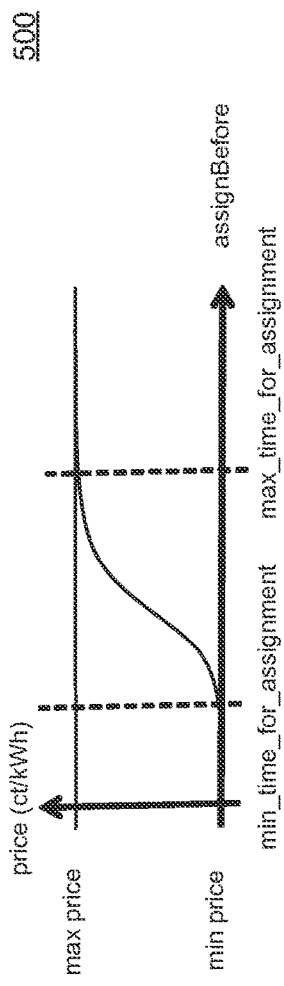
FIGS. 5 and 6 are illustrations of example empirical functions that can be used to compute prices of time-to-assign flexibility and start-time-interval flexibility in an offer of a flexible demand response event, respectively, in accordance with principles of the disclosure herein.

An example empirical function used in time-to-assignment flexibility evaluator module 411 to compute the price may be or may have a shape of a logistics function (not shown). FIG. 5 shows another example empirical function 500 which may be used in time-to-assignment flexibility evaluator module 411. Empirical function 500, which may approximate a logistics function, may be subject to the following asymptotic boundary conditions:

If the time-to assignment value in the flex-offer is less than or equal to the min_time_for_assignment parameter, then the price of the flexibility is a minimum price (e.g., 0); and If the time-to assignment value in the flex-offer is greater than or equal to the max_time_for_assignment parameter, then the price of the flexibility is a maximum price.

In the finite time interval between min_time_for_assignment and min_time_for_assignment, empirical function 500 may, for example, be approximated by a linear function, or as shown in FIG. 5, by a sigmoid function.

Start-Time-Interval Flexibility Evaluator Module 412

The start-time-interval flexibility is given by the difference between the start-after-time and start-before-time parameters in a flex-offer, and represents the range of time in which the BRP can schedule execution of the demand response event called for in the flex-offer. The start-time-interval flexibility indicates the amount of freedom or choice the BRP has in scheduling the event.

The start-time-interval flexibility evaluator module 411 may include algorithms based on an empirical function (e.g., function 600, FIG. 6), which convert a start-time-interval parameter in the flex-offer into an energy price. The empirical function used may be based on recognition that only a finite interval of start-time-interval parameter values (e.g., a min_flexibility_interval to a max_flexibility_interval) may be useful to the BRP for short term balancing of load and supply. Small values of start-time-interval may afford little flexibility to the BRP and thus may be of little value to the BRP. Conversely, large start-time-interval values above the finite time interval may not be proportionally more useful to the BRP for short term balancing of load and supply, and thus may be of limited additional value to the BRP.

Figure 6:
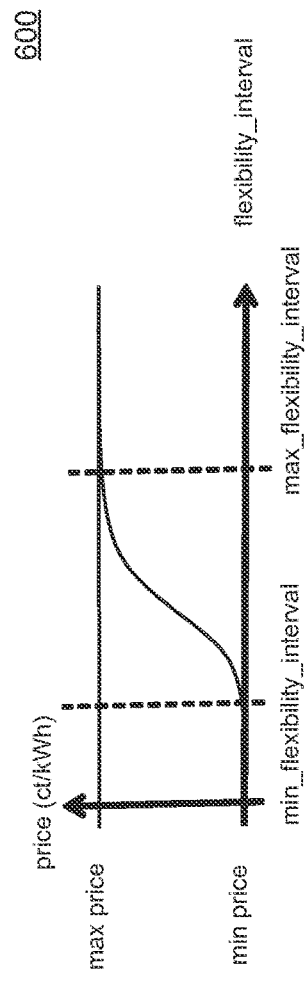

An example empirical function used to compute the price in start-time-interval flexibility evaluator module 412 may be or may have a shape of a logistics function (not shown). FIG. 6 shows another example empirical function 600, which may be used in start-time-interval flexibility evaluator module 412. Empirical function 600, which may approximate a logistics function, may be subject to the following asymptotic boundary conditions:

If the start-time-interval value in the flex-offer is less than or equal to the min_flexibility_interval parameter, then the price of the flexibility is a minimum price (e.g., 0); and If start-time-interval is greater than or equal to a max_flexibility_interval parameter, then the price of the flexibility is a maximum price.

In the finite time interval between min_flexibility_interval to max_flexibility_interval, empirical function 600 may, for example, be approximated by a linear function, or as shown in FIG. 6, by a sigmoid function.

Energy Flexibility Evaluator Module

The difference between minimum energy required and maximum energy required as proposed in the flex-offer may describe an "energy flexibility" parameter of the flex-offer. The energy flexibility of a demand response event with an energy profile in the flex-offer may be computed as the mean value of the energy flexibilities for the time intervals in the energy profile. The energy flexibility may be an indication of the amount of freedom or choice the BRP has in balancing load with supply using the flex-offer.

Energy flexibility evaluator module 413 may include algorithms based on an empirical function to convert an energy flexibility parameter of the flex-offer into an energy price. The empirical function used may be based on recognition that only a finite interval of energy flexibility parameter values may be useful to the BRP for short term balancing of load and supply. Small values of energy flexibility may afford little flexibility to the BRP and thus may be of little value to the BRP. Conversely, large energy flexibility values above the finite interval of energy flexibility parameter may not be proportionally more useful to the BRP for short term balancing of load and supply, and thus may be of limited additional value to the BRP.

An example empirical function used to compute the price in energy flexibility evaluator module 413 may be or have a shape of a logistics function (not shown). An empirical function, which may approximate a logistics function, may be subject to the following asymptotic boundary conditions:

If the energy flexibility in the flex-offer is less than or equal to the min_energy_flexibility parameter, then the price of the flexibility is a minimum price (e.g., 0); and If the energy flexibility in the flex-offer is less than or equal to the max_energy_flexibility parameter, then the price of the flexibility is a maximum price.

In the interval between min_energy_flexibility to max_energy_flexibility, empirical function 600 may, for example, be approximated by a linear function, or as shown in FIG. 6, by a sigmoid function.

An example empirical function used in energy flexibility evaluator module 413 to compute a price for the energy flexibility of a flex-offer may have a shape similar to the shape of functions 500 or 600 shown in FIGS. 5 and 6, respectively.

Aggregator Module 414

Aggregator module 414 in evaluator application 410 may include aggregating algorithms configured to aggregate the price values of the individual flexibilities computed by evaluator parameter modules 411-413 to generate a flex-offer potential value (e.g., flex-offer potential 402) for the entire flex-offer. The aggregating algorithms may, for example, be based on weighted sum function. In an example implementation, the weighted sum function may be a linear sum function.

As an example, modules 411-413 may return values of 0.5 ct, 1 ct, and 1.5 ct as price values for time-to-assignment flexibility, start-time-interval flexibility and energy flexibility, respectively, of a flex-offer. Further, using a linear sum function, aggregator module 414 may return a value of 3.0 ct as the potential of the flex-offer.

After the flex-offer is priced by evaluator application 410, the utility company or BRP may make a decision to accept or reject the flex-offer based on criteria, which may include price criteria. The BRP may, for example, compare the price of the flex-offer with a fixed or variable threshold price, and accordingly accept of reject the flex-offer.

Figure 7:
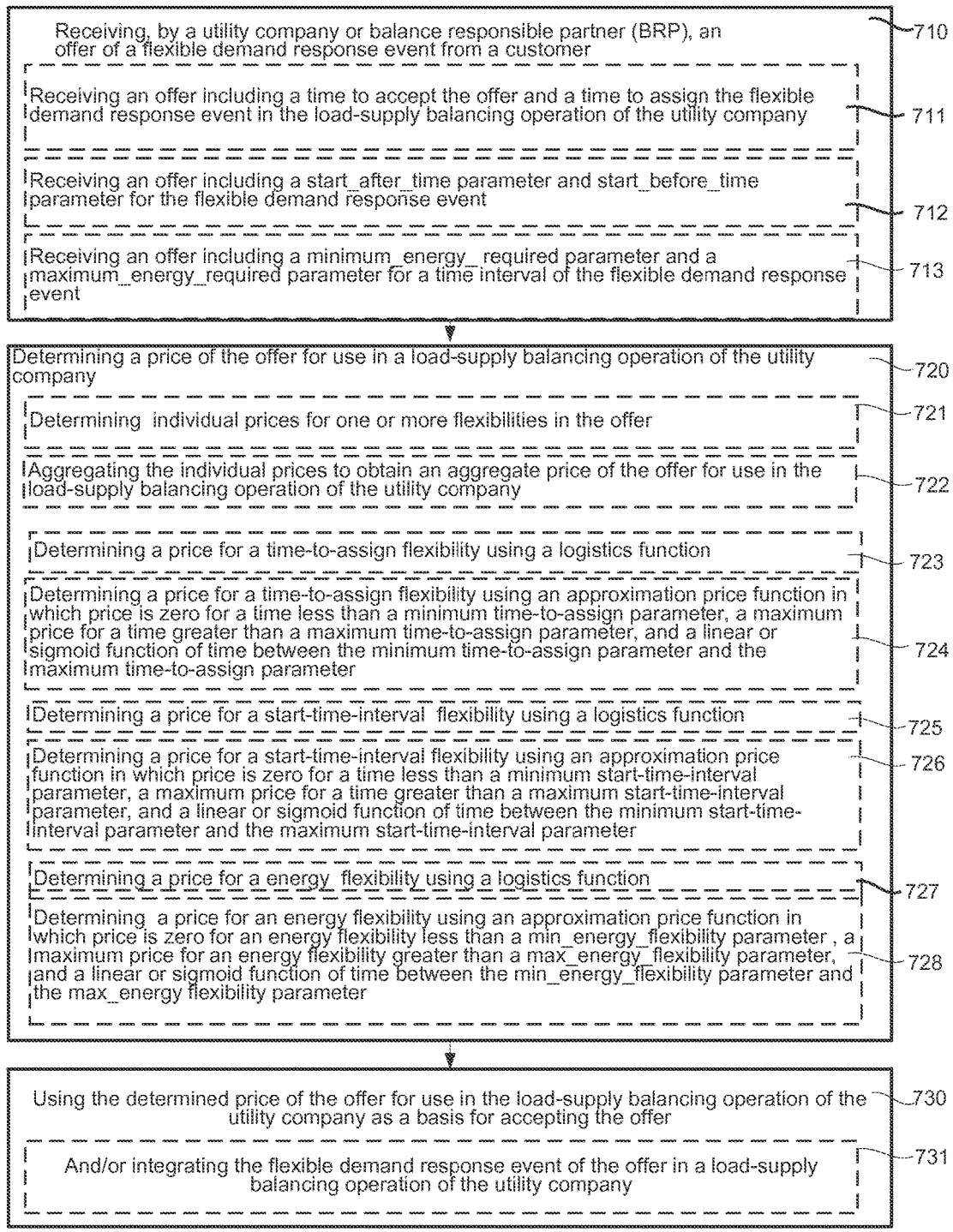
FIG. 7 is a flow diagram illustration of an example computer-implemented method for evaluating and pricing an offer of flexible demand response event, which may be received by a utility company or balance responsible partner (BRP) from a consumer or supplier of energy, in accordance with principles of the disclosure herein.

FIG. 7 shows an example computer-implemented method 700 for executing instructions stored on a non-transitory computer readable storage medium. Method 700 may be used to evaluate and price an offer of flexible demand response event ("flex-offer"), which may be received by a utility company or balance responsible partner (BRP) from a consumer or supplier of energy. The price value of the flex-offer may be based on, for example, the amount or degree of flexibility proposed by the consumer or supplier in one or more parameters of the flexible demand response event. The BRP's acceptance or rejection of the flex-offer and also any monetary rebate or incentive credited to the consumer may be based on the computed price value of the potential of the flex-offer in context of a load-supply balancing operation of the utility company.

Method 700 may include receiving, by a utility company or balance responsible partner (BRP), an offer of a flexible demand response event from a customer (710), and determining a price of the offer in context of a load-supply balancing operation of the utility company (720).

In method 700, receiving an offer of a flexible demand response event from a customer 710 may include receiving an offer including a time to accept the offer and a time to assign the flexible demand response event in the load-supply balancing operation of the utility company (711). Receiving an offer of a flexible demand response event from a customer 710 may further include receiving an offer including a start_after_time parameter and start_before_time parameter for executing the flexible demand response event (712), and receiving an offer including a minimum_energy_required parameter and a maximum_energy_required parameter for a time interval of the flexible demand response event (713). Different time intervals of the flexible demand response event may have different minimum_energy_required parameters and different maximum_energy_required parameters.

In method 700, determining a price of the offer in context of a load-supply balancing operation of the utility company 720 may include determining individual prices for one or more flexibilities in the offer (721) and aggregating the individual prices to obtain an aggregate price of the offer in context of the load-supply balancing operation of the utility company (722). The one or more flexibilities in the offer may include one or more of a time-to-assign flexibility, a start-time-interval flexibility and an energy amount flexibility. The aggregate price of the offer in context of the load-supply balancing operation of the utility company may be computed as a weighted sum of the individual prices for one or more flexibilities in the offer.

Determining individual prices for one or more flexibilities in the offer 721 may include determining a price for a time-to-assign flexibility using a logistics function to compute the price (723) and/or determining a price for a time-to-assign flexibility using an approximation price function in which price is zero for a time less than a minimum time-to-assign parameter, a maximum price for a time greater than a maximum time-to-assign parameter, and a linear or sigmoid function of time between the minimum time-to-assign parameter and the maximum time-to-assign parameter (724).

Further, determining individual prices for one or more flexibilities in the offer 721 may include determining a price for a start-time-interval flexibility using a logistics function (725) and/or determining a price for a start-time-interval flexibility using an approximation price function in which price is zero for a time less than a min_flexibility_interval parameter, a maximum price for a time greater than a max_flexibility_interval parameter, and a linear or sigmoid function of time between the max_flexibility_interval parameter and the max_flexibility_interval parameter (726).

Determining individual prices for one or more flexibilities in the offer 721 may also include determining a price for an energy flexibility using a logistics function to compute the price (727) and/or determining a price for an energy flexibility using an approximation price function in which price is zero for an energy flexibility less than a min_energy_flexibility parameter, a maximum price for an energy flexibility greater than a max_energy_flexibility parameter, and a linear or sigmoid function of time between the min_energy_flexibility parameter and the max_energy_flexibility parameter (728).

Method 700 may further include using the determined price of the offer in context of a load-supply balancing operation of the utility company as a basis for accepting the offer (730) and/or integrating the flexible demand response event of the offer in a load-supply balancing operation of the utility company (731).

A non-transitory computer readable medium may bear instructions capable of being executed on a processor, which instructions when executed may implement all or portions of method 700.

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable in context of a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A load balancer system coupled to an electrical grid, the system comprising:
   a memory;
   a processor coupled to the memory, the processor receiving an offer of a flexible demand of electricity from a customer, and executing an evaluator application to evaluate price values of a flexible demand response event for the flexible demand of electricity from the customer in context of a load balancing operation of electrical supply over the electrical grid by a utility company, the offer including a minimum energy_required parameter and a maximum_energy_required parameter for a time interval of the flexible demand response event, and acceptance, assignment and execution flexibility time parameters of the flexible demand response event; and
   an electrical supply controller controlling electrical supply over the electrical grid by the utility company to balance loads on the electrical grid to accommodate the flexible demand response event for the flexible demand of electricity from the customer at a price value accepted by the utility company.

2. The load balancer system of claim 1, wherein the evaluator application is configured to value individual flexibilities of one or more parameters of the flexible demand response event in context of the load-supply balancing operation of the utility.

3. The load balancer system of claim 2, wherein the evaluator application is configured to aggregate the values of the individual flexibilities as a single price of the offer.

4. The load balancer system of claim 1, wherein the evaluator application is configured to individually value one or more of a time-to-assignment flexibility, a start-time-interval flexibility and an energy flexibility of the flexible demand response event in context of the load-supply balancing operation of the utility.

5. The load balancer system of claim 1, wherein the evaluator application is configured to individually value one or more of a time-to-assignment flexibility, a start-time-interval flexibility and an energy flexibility using a logistics function to compute price.

6. The load balancer system of claim 1, wherein the evaluator application is configured to individually value one or more of a time-to-assignment flexibility, a start-time-interval flexibility and an energy flexibility using an approximation to a logistics function to compute price.

7. A non-transitory computer readable medium carrying instructions capable of being executed on a processor, which instructions when executed allow a load balancer system to:
   receive an offer of a flexible demand of electricity from a customer of a utility company, the offer including a minimum energy_required parameter and maximum_energy_required parameter for a time interval of a flexible demand response event for the flexible demand of electricity from the customer, and acceptance, assignment and execution flexibility time parameters of the flexible demand response event; and
   determine a price of the offer in context of a load-balancing operation of the utility company; and
   control electrical supply over the electrical grid by the utility company to balance loads on the electrical grid to accommodate the flexible demand response event for the flexible demand of electricity from the customer at a price value accepted by the utility company.

8. The non-transitory computer readable medium of claim 7, wherein the offer includes a time to accept the offer and a time to assign the flexible demand response event in the load-supply balancing operation of the utility company.

9. The non-transitory computer readable medium of claim 7, wherein the offer includes a start_after_time parameter and a start_before_time parameter for the flexible demand response event.

10. The non-transitory computer readable medium of claim 7, wherein the offer includes a minimum_energy_required parameter and a maximum_energy_required parameter for a time interval of the flexible demand response event.

11. The non-transitory computer readable medium of claim 7, wherein the instructions when executed allow the load balancer system to determine the price of the offer in context of the load-supply balancing operation of the utility company by determining individual prices for flexibilities of one or more parameters of the flexible demand response event in the offer and aggregating the individual prices to obtain an aggregate price of the offer in context of the load-supply balancing operation of the utility company.

12. The non-transitory computer readable medium of claim 11, wherein the instructions when executed allow the load balancer system to determine the price of the offer in context of a load-supply balancing operation of the utility company by determining a price for a time-to-assign flexibility using a logistics function to compute the price.

13. The non-transitory computer readable medium of claim 12, wherein determining the price for the time-to-assign flexibility using the logistics function to compute the price includes using an approximation price function in which price is zero for a time less than a minimum time-to-assign parameter, a maximum price for a time greater than a maximum time-to-assign parameter, and a linear or sigmoid function of time between the minimum time-to-assign parameter and the maximum time-to-assign parameter.

14. The non-transitory computer readable medium of claim 11, wherein the instructions when executed allow the load balancer system to determine the price of the offer in context of a load-supply balancing operation of the utility company by determining a price for a start_time_interval flexibility using a logistics function to compute the price.

15. The non-transitory computer readable medium of claim 14, wherein determining the price for the start_time_interval flexibility using the logistics function to compute the price includes using an approximation price function in which price is zero for a time less than a minimum start_time_interval parameter, a maximum price for a time greater than a maximum start_time_interval parameter, and a linear or sigmoid function of time between the minimum start_time_interval parameter and the maximum start_time_interval parameter.

16. The non-transitory computer readable medium of claim 11, wherein the instructions when executed allow the load balancer system to determine the price of the offer in context of a load-supply balancing operation of the utility company by determining a price for an energy flexibility using a logistics function to compute the price.

17. The non-transitory computer readable medium of claim 16, wherein determining the price for the energy flexibility using the logistics function to compute the price includes determining a price for an energy flexibility using an approximation price function in which price is zero for a time less than a min_energy_flexibility parameter, a maximum price for a time greater than a max_energy_flexibility parameter, and a linear or sigmoid function of time between the min_energy_flexibility parameter and the max_energy_flexibility parameter.

18. A computer-implemented method performed by instructions executed on a processor, the method comprising:
receiving an offer of a flexible demand of electricity from a customer of a utility company, the offer including a minimum energy_required parameter and a maximum_energy_required parameter for a time interval of a flexible demand response event for the flexible demand of electricity from the customer, and acceptance, assignment and execution flexibility time parameters of the flexible demand response event; and
determining a price of the offer in context of a load-supply balancing operation of the utility company; and
controlling electrical supply over the electrical grid by the utility company to balance loads on the electrical grid to accommodate the flexible demand response event for the flexible demand of electricity from the customer at a price value accepted by the utility company.

19. The method of claim 18, wherein determining the price of the offer includes determining individual prices for flexibilities of one or more parameters of the flexible demand response event in the offer and aggregating the individual prices to obtain an aggregate price of the offer in the context of the load-supply balancing operation of the utility company.

20. The method of claim 18, further comprising, using the price of the offer in context of a load-supply balancing operation of the utility company as a basis for accepting the offer.

* * * * *